Jan. 4, 1938.  H. FORD  2,104,455
POWER OPERATED CLUTCH AND BRAKE MECHANISM
Original Filed July 27, 1932  3 Sheets-Sheet 1
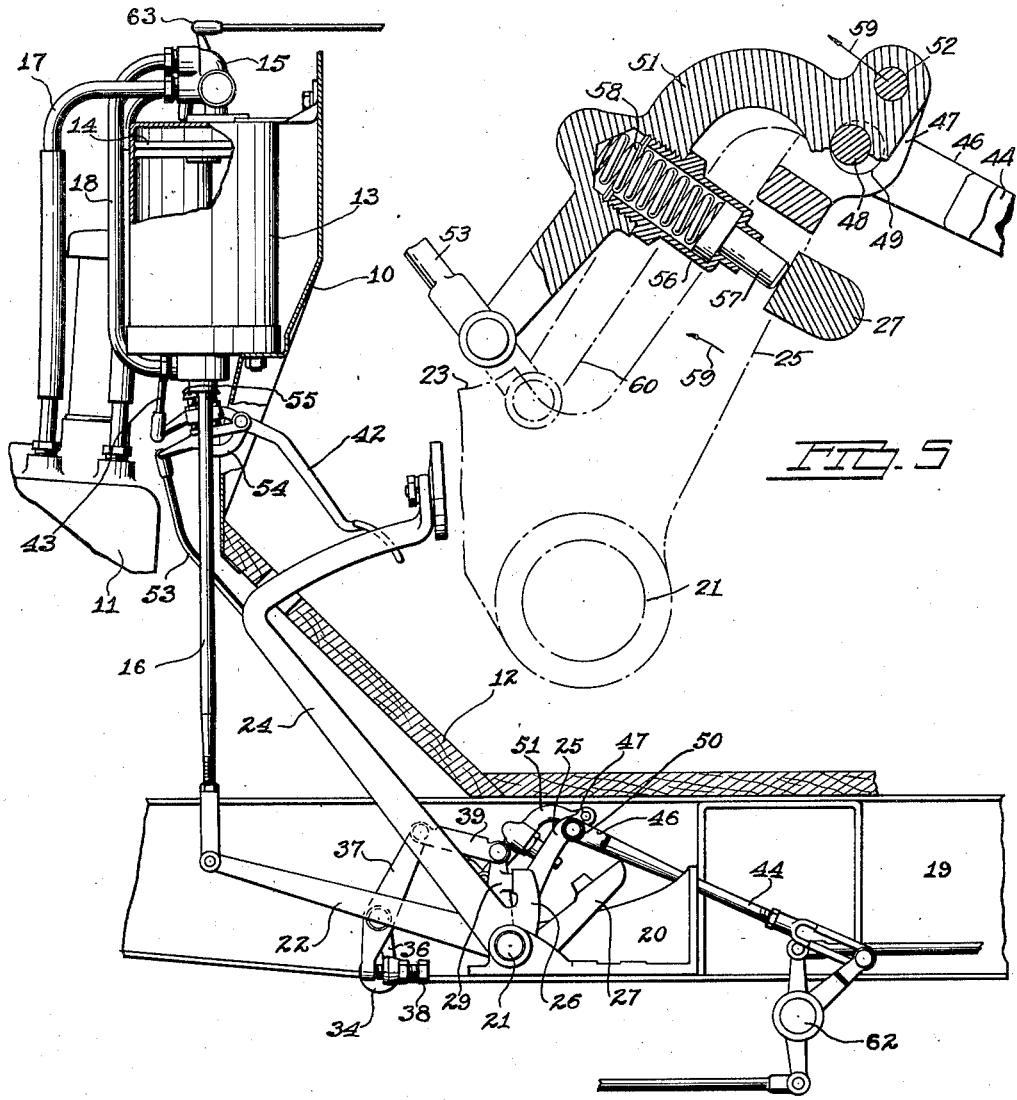
INVENTOR.
Henry Ford.
BY
ATTORNEY.

Jan. 4, 1938.                    H. FORD                       2,104,455
              POWER OPERATED CLUTCH AND BRAKE MECHANISM
                Original Filed July 27, 1932      3 Sheets-Sheet 2
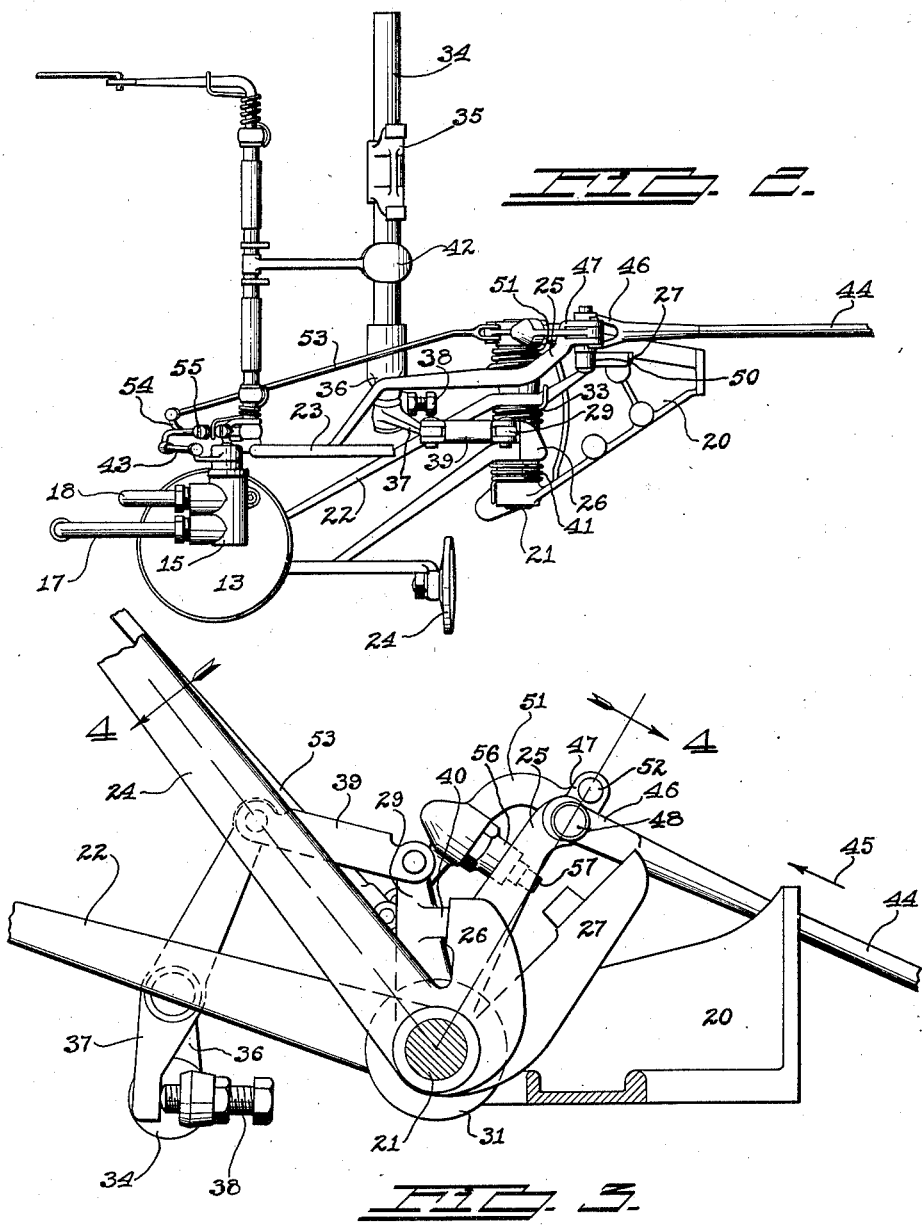
INVENTOR.
Henry Ford.
BY
ATTORNEY.

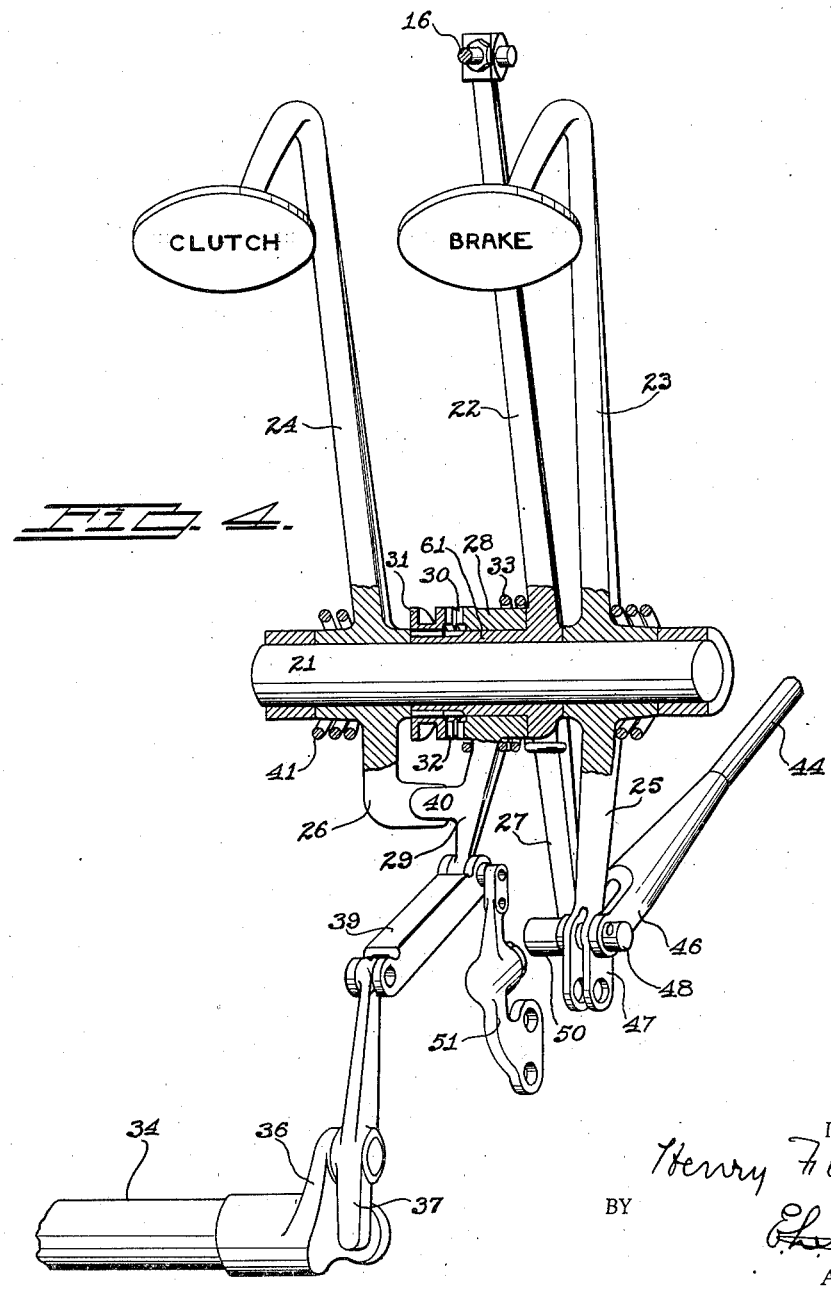

Patented Jan. 4, 1938

2,104,455

UNITED STATES PATENT OFFICE 2,104,455

POWER OPERATED CLUTCH AND BRAKE MECHANISM

Henry Ford, Dearborn, Mich., assignor to Ford Motor Company, Dearborn, Mich., a corporation of Delaware Application July 27, 1932, Serial No. 625,053
Renewed July 6, 1937

18 Claims. (Cl. 192—.01)

The object of my invention is to provide a power operated clutch and brake mechanism especially adapted for use in automotive vehicles whereby the manual energy ordinarily required to operate the vehicle clutch and brake pedals will be materially reduced. This device is ordinarily termed a servo-mechanism. The source of power used to operate this mechanism is the vacuum produced in the intake manifold of the vehicle engine, nevertheless, fluid pressure from any other source such as a hydraulic pump, vacuum pump, air pump or electric power may be readily used if desired.

Specifically, my invention comprises an improved vacuum operated cylinder having a piston or diaphragm therein, which piston is connected through a suitable valve with the intake manifold of the engine. This valve is actuated through suitable mechanism by the accelerator pedal of the vehicle whereby depression of the accelerator shuts off the vacuum and inversely, when the foot is taken off the accelerator pedal then the vacuum is in connection with the cylinder and actuates the piston therein. The piston is connected through a novel linkage mechanism with both the brake and the clutch pedals of the vehicle whereby under certain conditions movement of the piston through the first half of its stroke disengages the engine clutch and movement of this piston through the remainder of the stroke applies the vehicle brake while holding the clutch disengaged.

In order that the movement of the piston may come to a stop in its intermediate position or as soon as the clutch is thrown out so as not to apply the brake each time the clutch is released, an auxiliary control mechanism is provided which actuates the vacuum valve and closes same as soon as the clutch is released independently of the accelerator pedal. When the brake pedal is depressed this same valve is opened again which moves the piston further on its stroke to thus apply the brake while keeping the clutch in its disengaged position. Upon the release of the brake pedal the piston returns to its intermediate position and upon subsequent depression of the accelerator pedal returns to its starting position at which time the clutch is engaged and the brakes are released.

The aforementioned arrangement permits what is known as freewheeling, that is, upon the release of the accelerator pedal the clutch is automatically disengaged and upon depression of this pedal the clutch is again engaged. Thus, the driving wheels of the vehicle are disconnected from the engine when decelerating or coasting down hill or when the brakes are applied.

There are times, however, when it is desirable to allow the clutch to remain engaged while the brake is being applied and further, under some conditions, it is desirable to allow the clutch to remain engaged while the accelerator pedal is relieved so that the frictional resistance of the engine may be used as a brake. This is particularly desirable in descending long hills where the continued application of the brakes of the vehicle would cause undue wear and heating thereof.

In order to accomplish this result it would be a simple matter to provide a manual control for the valve in the vacuum supply line. The disadvantage of this device is that when the freewheeling is disconnected in such manner both the brake and the clutch are required to be totally manually operated so that the advantages of the servo-mechanism cannot be utilized. When it is remembered that the real advantage of providing a servo-operated brake mechanism is that a brake lining having a low coefficient of friction and consequently a very long life may be utilized with such mechanism, whereas such brake lining could not be used if a manual operated brake were provided. For this reason it is desirable that the servo-brake mechanism be in operation at all times and not simply when the freewheeling device is engaged. With my improved device, even when the automatic clutch feature is not being utilized, the servo-mechanism still actuates the brake upon the initial or control movement of the brake pedal.

Still a further object of my invention is to provide a power or servo-operated clutch mechanism which will provide a major portion of the energy required to throw out the clutch when the freewheeling mechanism is not being used. Heretofore, servo-clutch mechanisms have invariably been provided with follow-up mechanisms similar to the follow-up devices used on servo-operated brakes. The disadvantage of such structure is that the clutch cannot be engaged easily or smoothly under certain conditions. My improved device differs from this construction in that the servo-member simply spring loads the clutch pedal so that the same may be manually operated with an extremely light pressure. This function may be better understood when it is brought out that the servo-piston upon the release of the accelerator pedal always moves to its intermediate position and that this piston is connected with the engine clutch by either a positive jaw clutch or by a coil spring so that when the positive jaw clutch is engaged then the downward movement of the piston automatically disengages the clutch without the actuation of the clutch pedal, while when the jaw clutch is disengaged then the downward movement of the piston loads up the spring which connects it with the clutch so that only an extremely light pedal pressure is required to overcome the resistance of the clutch spring.

Of course, the loading of this servo-spring reduces the torque which the clutch can safely carry but inasmuch as the frictional resistance or drag of the engine is never over twenty-five per cent of the torque developed by the engine, only one-fourth the clutch pressure is required to transmit this resistance or braking load. Consequently, a spring pressure equivalent to seventy-five per cent of the clutch spring torque may be safely used without reducing the factor of safety of the clutch. Thus, only twenty-five per cent of the work of disengaging the clutch need be done by the operator, which in an ordinary vehicle amounts to a very light pedal pressure.

Still a further object of my invention is to provide a servo-operated brake mechanism in which the control pedal is preloaded with a relatively heavy spring pressure. It has been conventional practice for a considerable time to preload the control pedals of servo-brake mechanisms so that the bake will have a definite feel to thereby prevent the accidental instantaneous application of the brake when only a slight application is desirable. For this reason it has been customary to provide a spring capable of resisting a foot-pedal pressure of from fifty to seventy-five pounds in order to develop this resistance or feel in the pedal. In all of such installations known to the applicant, the servo-mechanism has been required to overcome this spring resistance before the brake is applied which not only utilizes considerable of the servo-mechanism power but also requires that this spring tension be manually overcome even when the servo-mechanism fails to operate.

With my improved device I have provided a preloading spring, but have disposed such spring in such a way that the servo-mechanism is not required to overcome the resistance thereof so that the full power of the servo-mechanism is utilized solely in applying the brakes. Still further, in case the servo-mechanism for any reason fails to operate then the manual effort which would ordinarily be used in compressing the preloading spring is used solely to apply the brakes, none of this pressure being utilized to overcome the preloading spring pressure. This is especially desirable where a low coefficient brake lining is utilized as the full pedal pressure is required to operate such brakes manually.

With these and other objects in view my invention consists in the arrangement, construction and combination of the various parts of my improved device, as described in the specification, claimed in my claims, and illustrated in the accompanying drawings, in which:

Figure 1 shows a side elevation of my improved device when installed upon an automobile chassis.

Figure 2 shows a plan view of the device shown in Figure 1.

Figure 3 shows an enlarged view of the pedal fulcrum and associated parts.

Figure 4 shows a perspective view illustrating somewhat diagrammatically the construction and function of the several pedals and levers used in this device. This is not a truly represensative view but is designed to show the parts diagrammatically, it being taken somewhat along the dotted line 4—4 in Figure 3 with the several levers and associated arms shown in a single plane to better illustrate the construction, and Figure 5 is a sectional view, taken through the brake control follow-up mechanism.

Referring to the accompanying drawings, and particularly Figure 1, I have shown a dash member 10 which is supported upon a frame 19 and which forms the rear wall of an engine compartment in a motor vehicle, this vehicle having an engine 11 disposed therein which is located just forwardly of the dash 10. Several floor boards 12 are also provided which separate the engine and driver's compartments. Mounted upon the forward face of the dash and secured thereto in a vertical position, I have provided a cylinder 13 in which a suitable piston 14 is reciprocally mounted. The piston is connected to a piston rod 16 which extends downwardly in a vertical direction to a position somewhat beneath the floor boards of the car. A valve 15 is fastened to the upper end of the cylinder 13 which valve is connected by a tube 17 with the intake manifold. A second tube 18 connects that portion of the cylinder beneath the piston with the valve 15 whereby the vacuum may draw the piston downwardly in the cylinder. When the valve 15 is in its closed position, vacuum in the tube 17 will cause no movement of the piston, but when the valve is opened then vacuum in the intake manifold will draw the piston 14 downwardly to the bottom of the cylinder.

Mounted upon the frame 19 of the vehicle I have provided a bracket 20 in which a transverse shaft 21 is secured. Among other things, this shaft 21 is adapted to rotatably mount one end of a power lever 22, the other end of this lever being pivotally connected with the lower end of the rod 16 whereby reciprocation of this rod will oscillate the lever 22 around the shaft 21.

Referring now to Figure 4, it will be seen that I have provided a brake pedal 23, together with a clutch pedal 24, these two pedals being pivotally mounted on the shaft 21 on either side of the lever 22. The brake pedal 23 is forged integrally with a brake operating arm 25 and the clutch pedal is likewise forged integrally with a clutch operating arm 26 so that operation of either of these pedals will actuate the respective arm. The lever 22 is formed integrally with a power arm 27.

It will be noted from this figure that the lever 22 is provided with a cylindrical hub member 61 upon which a sleeve 28 is rotatably mounted. This sleeve is formed integrally with an arm 29, the sleeve having a plurality of clutch teeth 30 machined in its outer end. It will also be noted that a shiftable clutch collar 31 is splined on the outer end of the hub member 61 which collar is provided with clutch teeth 32 so that by shifting the collar to the right, as shown in this figure, the arm 29 and the lever 22 will be positively connected together so as to oscillate in both directions as a unit. However, upon shifting the collar 31 to the left, then the sleeve 28 is free to oscillate relative to the lever 22 or inversely, oscillation of the lever 22 caused by reciprocation of the piston 14 will not positively oscillate the arm 29. However, a helical spring 33 is wound around this sleeve and has one end hooked over the arm 29 the other being hooked over the arm 27 whereby oscillation of the lever 22 will tension the spring 33 thereby tending to oscillate the arm 29, according to the stiffness of the spring 33.

It will be noted that I have provided a clutch throw-out shaft 34 which extends through the clutch housing of the vehicle engine and which throw-out shaft is provided with a conventional fork 35 which coacts with the main clutch of the engine so that oscillation of the shaft 34 will throw out of engagement the engine clutch. One end of the shaft 34 projects out through the side of the transmission and an arm 36 is secured thereto, which arm has a beam 37 pivotally mounted at its outer end, one end of which beam extends radially away from the center of the shaft while the other end extends back towards this center. An adjusting screw 38 is threaded into the arm 36 in position to coact with the inner end of the beam 37 so that oscillation of the outer end of the beam 37 to the left, as shown in Figure 3, will throw out the engine clutch while oscillation of said beam to the right will simply pivot the beam around the outer end of the arm 36. A sheet metal connecting link 39 connects the outer ends of the beam 37 with the arm 29.

From the foregoing it will be seen that movement of the lever 22 downwardly when the jaw clutch 31 is engaged will oscillate the arm 29 which will reciprocate the link 39 thereby oscillating the beam 37 and shaft 34 to throw out the engine clutch. However, when the clutch 31 is moved to its disengaged position then oscillation of the lever 22 will simply tension the spring 33 thereby tending to oscillate the arm 29. As the spring 33 is capable of resisting only about seventy-five per cent of the force of the springs in the main clutch, it will be seen that at this time the engine clutch does not disengage but simply that the spring pressure on the clutch is lessened due to the counteracting force of the spring 33.

Now in order that the engine clutch may be manually disengaged, the arm 29 is provided with a tab 40 which is in position aligned with the outer end of the arm 26. Consequently, manual oscillation of the clutch pedal 24 will cause the arm 26 to oscillate the arm 29 thereby manually throwing out the engine clutch. A relatively weak helical spring 41 is disposed between the bracket 20 and clutch pedal 24 to return the clutch pedal to its inoperative position when the operator releases same.

During normal driving of the vehicle an accelerator pedal which is given the reference numeral 42 is normally held in a depressed position. This pedal is connected through a control rod 43 with the valve 15 and returns the valve to its closed position at this time insuring that the piston 14 and lever 22 remain in their inoperative positions. When, however, the pedal 42 is released then the valve 15 is opened and connects the vacuum tube 17 with the underside of the piston thereby drawing the piston downwardly so as to oscillate the lever 22. When the clutch collar 31 is in its engaged position the engine clutch is automatically disengaged by this movement, however, when the clutch 31 is in its disengaged position then upon releasing the accelerator pedal the lever 22 still oscillates but the clutch remains engaged until the clutch pedal 24 is actually moved by the operator's foot. Due to the energy stored up in the spring 33 the movement of the clutch pedal is accomplished with much less exertion than would be necessary to throw out the main engine clutch without the servo-mechanism. In fact, the pedal pressure is reduced to about one-fourth its usual amount without lessening the torque which the clutch is capable of transmitting under ordinary driving conditions. As the clutch-pedal pressure is reduced only when the accelerator is released and as the maximum torque resistance developed by the engine at this time is only about one-fourth of its power output, there is no probability that the clutch will slip due to its lessened spring pressure even though its full pressure is a little more than enough to transmit the normal torque of the engine.

Referring now to the brake hook-up, it will be noted that I have provided a rod 44 which extends forwardly from a main brake cross shaft on the vehicle, and which rod is connected thereto so that movement of this rod in the direction shown by arrow 45 will apply the vehicle brakes. The forward end of the rod 44 is provided with a clevis 46 which slips over a clevised end 47, which is formed on the end of the arm 25, and a pin 48 extends through these two clevises so that oscillation of the arm 25 will apply the brakes. It will be noted from Figure 5 that the pin 48 is closely fitted in the clevis 46, however, a relatively large clearance opening 49 is disposed in the clevis 47 so that considerable movement is permitted between the pin 48 and the clevis 47. The purpose of this clearance is to provide a limited movement between the arm 25 and the brake rod 44 this movement being used to actuate a control mechanism which in turn operates the servo-device. The pin 48 is provided with a head 50 which is aligned with the outer end of the power arm 27, and this pin and arm 27 are so proportioned that when the brake pedal 23 is in its inoperative position the arm 27 will not contact with the head 50. It is only after the engine clutch has been thrown out by movement of the lever 22 that the arm 27 strikes against the head 50 so that further movement of this arm causes the brakes to be applied.

Referring to Figure 5, it will be seen that a control beam 51 is pivotally secured by means of a pin 52 to the outer end of the clevis 47. The pin 52 closely fits both the openings in the clevis and the openings in the beam 51 so that only pivotal movement between these two members is permitted. It will also be noted that the beam 51 extends down through the clevis 47 and is provided with an opening therethrough aligned with the pin 48 which opening is proportioned so that an intimate fit is made with this pin. While there is clearance between the pin 48 and the opening 49 in the arm 25, there is no clearance between the pin 48 and the opening in the beam 51. Thus, the beam 51 and clevis 46 are linked together so that relative movement therebetween is prevented. The beam 51 and clevis 46 may thus pivot as a unit around the pin 52 and arm 25.

The free end of the beam 51 is secured to an operating rod 53 which extends upwardly where it is secured to an arm 54, the outer end of which is pivotally mounted upon the accelerator shaft. Oscillation of the accelerator pedal does not tend to move the arm 54 but the accelerator shaft simply serves as a fulcrum to support this arm. An adjusting screw 55 is disposed between the accelerator pedal and the arm 54, whereby movement of the rod 53 upwardly causes the rod 43 to likewise move upwardly and thereby close the valve 15. Consequently, either downward movement of the accelerator pedal or upward movement of the rod 53 will close the valve 15 to relieve the vacuum in the cylinder 13.

It will be noted from Figure 5 that the intermediate portion of the beam 51 is provided with a sleeve 56 screwed therein, this sleeve having a plunger 57 reciprocally mounted in its outer end. A relatively stiff compression spring 58 is interposed between the plunger 57 and the beam, this spring serving, as will hereinafter be described, to load up the brake pedal. The arm 27 is offset so as to be substantially aligned with the plunger 57 and the parts are so proportioned that when the power lever 22 reaches an intermediate position along its stroke, or to the position assumed thereby when the clutch is thrown out, then the arm 27 will bear against the plunger 57 thus moving the beam 51 around the pivot 52 so as to reciprocate the rod 53 thereby closing the valve 15. The spring 58 possesses sufficient resistance so that as far as this function is concerned the plunger 57 and beam 51 may be considered as a rigid unit. Thus, while the engine clutch is held in its disengaged position the arm 27 is being retained in the position shown in Figure 5. It will further be noted that even though the freewheeling clutch 31 is disengaged so that the engine clutch is not automatically thrown out, upon releasing the accelerator the power lever 22 and arm 27 advance to the position shown in Figure 5 irrespective of the functioning of the engine clutch. Thus, under every condition when it is desired to apply the brakes, the arm 27 will be in the position shown in Figure 5.

If it is now desired to apply the brakes of the car, it is only necessary to depress the foot pedal 23 thereby moving the arm 25 in the direction shown by arrow 59. This action moves the pivot pin 52 in the same direction but there being considerable clearance between the opening 49 and the pin 48 a direct pull on the clevis 46 is not at this time accomplished. However, if the clevis 46 remains stationary while the pin 52 advances, then the beam 51 must oscillate around the pin 52 to the position shown by dotted lines 60 to thereby draw the rod 53 downwardly thus opening the valve 15. As the arm 27 is in the direct path of such pivotal movement of the beam 51, the spring 58 must be compressed to complete this movement. This compression can be accomplished solely by the movement of the brake pedal 23. This spring can, of course, be so proportioned that any desired resistance to the movement of the pedal is readily obtainable.

When the valve 15 is opened by the aforementioned action, then the power lever 22 is forced still further downwardly thus moving the arm 27 in the same direction as the arrow 59 so that if the arm 25 is manually moved through say five degrees, then the lever 22 moves through the same five-degree movement thereby forcing the beam 51 back to its former position wherein the valve 15 closes. A further movement of the arm 52 is followed up by the same movement of the arm 27.

Now in order that movement of the lever 22 may apply the brakes, the outer end of the arm 27 is proportioned so as to bear against the head 50 of the pin 48 when the mechanism is in the position shown in Figure 5. However, when the brake pedal is depressed the opening 49 moves forwardly in relation to the pin 48 so that the head 50 bears against the end of the arm 27. Consequently, the follow-up movement of the arm 27 directly moves the clevis 46 and rod 44 to thereby apply the vehicle brakes. Thus, the only manual energy required to apply the brakes is that necessary to compress the spring 58.

A very important feature in connection with this device is that the lever 22 and arm 27 when they oscillate to apply the brakes, bear directly against the head 50 of the pin 48 so that the servo-mechanism is not required to overcome or compress the spring 58. It is true that the spring 58 must be compressed to start the servo-device but this compression is accomplished solely by the manual force of the operator. This function will be more apparent when it is considered that there is no anchorage for the spring 58 against the frame of the vehicle so that even though it is under compression when the brakes are applied, still this compression cannot in any way work against or detract from the force of the servo-mechanism.

It is apparent that if for any reason the vacuum of the engine should fail, upon depressing the brake pedal 23, the arm 25 will move in the direction of the arrow 59 thus pivoting the beam 51 around the pivot 52 to position where the pin 48 bears against the rear of the opening 49 at which time a solid connection is made between the arm 25 and clevis 46. The arm 27 being at this time in its inoperative position, or that shown in Figure 1, and the vacuum having failed, the plunger 57 will not strike against this arm so that the compression of the spring 58 is not required. Thus, in case the servo-device fails the full energy of the brake applying force is conducted directly to the brake mechanism and no portion thereof is utilized in compressing the preloading spring. This feature is very desirable as a brake lining having a low coefficient of friction may be used and still ample braking efficiency be obtained.

Just as an additional safety feature, I have provided a manual control 63 for the valve 15 whereby this valve may be operatively closed to allow the engine, clutch and brake mechanism to operate exactly as in the conventional car. This control should not be confused with the control for the freewheeling clutch 31, as the latter, while eliminating the automatic clutch throw out, still retains the servo-operated clutch and brake functions. The control 63 prevents all movement of the servo-mechanism and is designed to be used primarily to contrast the difference in operation between the conventional vehicle and this improved servo-mechanism.

Among the many advantages arising from the use of my improved device it may be well to repeat that I have provided a servo-mechanism of relatively simple and inexpensive construction and in which a single power cylinder is used to both throw out the clutch and to apply the brakes.

Further, that this power cylinder is so arranged that either the clutch or brake can be selectively operated.

Still further, freewheeling is obtained, that is, upon releasing the accelerator pedal the clutch is automatically thrown out.

Still further, when freewheeling is not desired, the servo-mechanism still materially assists in overcoming the force required to manually throw out the clutch, which feature should be distinguished from the follow-up mechanism ordinarily associated with servo-clutches. These mechanisms, while successfully throwing out the clutch, still are difficult to operate when engaging the clutch, especially when it is desired to slip the clutch, as in parking the car. With my device the manual control of the clutch pedal is identically the same as is used in the conventional automobile the only difference being that a portion of the clutch spring pressure is counteracted by the servo-mechanism.

Still further, this device is provided with a preloading spring which produces a feel on the brake pedal and gives the desired characteristics to the operation of the brake and still the force of this spring is not required to be overcome either by the servo-mechanism or by the brake pedal when the device is manually operated. Consequently, the full manual or servo-force is utilized in actually applying the braking load.

Some changes may be made in the arrangement, construction and combination of the various parts of my improved device without departing from the spirit of my invention and it is my intention to cover by my claims such changes as may reasonably be included within the scope thereof.

I claim as my invention:

1. A servo-device adapted to operate the clutch of a vehicle comprising, a power actuated member, shiftable means for positively connecting the vehicle clutch with said power member whereby actuation of said member will disengage said clutch, said shiftable means being readily shifted to an inoperative position whereby actuation of said power member will not disengage said clutch, and resilient means connecting said power member and clutch located so that actuation of said power member when said shiftable member is inoperative will energize said resilient means to thereby partially counteract the force required to manually disengage the vehicle clutch.

2. A device, as claimed in claim 1, wherein the power actuated member comprises a piston adapted to reciprocate in a cylinder.

3. A device, as claimed in claim 1, wherein the power actuated member is operated by the intake manifold vacuum of the vehicle engine.

4. A device, as claimed in claim 1, wherein said shiftable means comprises a jaw clutch.

5. A device, as claimed in claim 1, wherein said resilient means comprises a metallic spring.

6. A servo-device adapted to automatically selectively disengage or assist in disengaging the clutch of a motor vehicle comprising, a power actuated member, control means operated by the release of the vehicle accelerator pedal for effecting the actuation of said power member, shiftable means for positively connecting the vehicle clutch with said power member whereby the release of said accelerator pedal will automatically disengage said clutch, said shiftable means being readily shifted to an inoperative position whereby the release of said accelerator pedal will not cause the disengagement of said clutch, and resilient means connecting said power member and clutch located so that the actuation of said power member when said shiftable member is inoperative will energize said resilient means to thereby partially counteract the force required to manually disengage the vehicle clutch only when said accelerator pedal is released.

7. A device, as claimed in claim 6, wherein the power actuated member comprises a piston adapted to reciprocate in a cylinder.

8. A device, as claimed in claim 6, wherein the power actuated member is operated by the intake manifold vacuum of the vehicle engine.

9. A device, as claimed in claim 6, wherein the power actuated member is operated by the intake manifold vacuum of the vehicle engine, and wherein said control means comprises a valve controlling said vacuum and which is opened upon the release of the accelerator pedal.

10. A device, as claimed in claim 6, wherein said shiftable means comprises a jaw clutch.

11. A device, as claimed in claim 6, wherein said resilient means comprises a metallic spring.

12. A servo-device adapted to operate the clutch of a motor vehicle comprising, a vacuum operated piston operatively connected to a power lever, whereby reciprocation of said piston will oscillate said lever, an arm adapted to be oscillated to disengage said clutch, said arm and lever being pivotally mounted in concentric positions, means for operatively clutching said arm and lever together whereby oscillation of said lever will oscillate said arm to positively disengage said clutch, said clutching means being readily disconnected so that oscillation of said lever will not disengage said clutch, and a spring interposed between said lever and said clutch arm whereby oscillation of said lever will energize said spring when the clutching means is disconnected, to thereby partially counteract the force required to manually disengage said clutch.

13. In a device, as claimed in claim 12, wherein said clutching means comprises a jaw clutch splined on said lever and manually shiftable into and out of engagement with said arm to thereby connect and disconnect said lever and arm.

14. In a servo-device adapted to operate the clutch and brake of a vehicle, a power actuated member operatively connected to said clutch and brake so that movement of said member through an initial portion of its stroke disengages the vehicle clutch and further movement thereof applies the vehicle brake, shiftable clutching means disposed in the connection between said member and clutch which in its inoperative position allows said member to move through said initial portion of its stroke without disengaging said clutch, means operated by releasing the vehicle accelerator pedal for effecting only said initial movement, and means operated by the vehicle brake pedal for effecting the full movement of said member to thus apply the brakes, said shiftable means permitting the operator to select whether or not the clutch will be automatically disengaged by the releasing of the accelerator pedal.

15. A device, as claimed in claim 14, wherein the power actuated member consists of a vacuum operated piston.

16. A device, as claimed in claim 14, wherein a resilient means is interposed between said power actuated member and said clutch which when said shiftable means is inoperative is stressed by the initial actuation of the power member to thus counteract a portion of the spring pressure required to hold the vehicle clutch in engagement only when said accelerator pedal is released.

17. A servo-device adapted to operate the clutch and brakes of a vehicle comprising, a reciprocable power actuated member, means connecting said member and the vehicle clutch whereby the initial portion of the stroke of said member disengages the vehicle clutch, a brake pedal, brake linkage extending between said pedal and the brakes of the vehicle, a controlling device mounted upon said pedal and movable thereon to effect the movement of the said power member by the manual application of said pedal, means connecting said power member with said brake linkage at a point between the vehicle wheel brakes and said controlling device, said last mentioned means having an arm associated therewith which moves relative to said controlling device upon the actuation of said power member to apply said brakes, a spring associated with said controlling device which coacts with said arm to urge the controlling device to its inoperative position only when said power member is effecting the disengagement of said clutch, said spring resisting the movement of said pedal only when said power member is functioning to apply the brakes.

18. A servo-device adapted to operate the brakes of a vehicle comprising, a power actuated member, an accelerator pedal, means connecting said accelerator pedal and power actuated member whereby said power member is actuated through an initial portion of its stroke by the release of said accelerator pedal, a vehicle clutch, means connecting said clutch and said power actuated member whereby said initial stroke portion disengages the vehicle clutch, a brake pedal, brake linkage extending between said pedal and the brakes of the vehicle, a controlling device mounted upon said pedal and movable thereon to effect the movement of said power member by the manual application of said brake pedal, means connecting said power member with said brake linkage at a point between the wheel brakes and said controlling device, said last mentioned connecting means having an arm associated therewith which moves relative to said controlling device upon the actuation of said power member to apply said brakes, a spring associated with said controlling device which coacts with said arm to urge the controlling device to its inoperative position only when said power member has moved from its starting position and only when said power member has disengaged the clutch, said spring resisting the movement of said brake pedal only when said power member is functioning to apply the brakes.

HENRY FORD.